United States Patent
Padawer

(10) Patent No.: US 10,943,295 B2
(45) Date of Patent: *Mar. 9, 2021

(54) CREDIT REPAIR BY ANALYSIS OF TRADE LINE PROPERTIES

(71) Applicant: PROGREXION IP, INC., North Salt Lake, UT (US)

(72) Inventor: Justin Randall Padawer, Bountiful, UT (US)

(73) Assignee: PROGREXION IP, INC., North Salt Lake, UT (US)

( * ) Notice: Subject to any disclaimer, the term of this patent is extended or adjusted under 35 U.S.C. 154(b) by 156 days.

This patent is subject to a terminal disclaimer.

(21) Appl. No.: 16/174,029

(22) Filed: Oct. 29, 2018

(65) Prior Publication Data

US 2019/0205979 A1     Jul. 4, 2019

Related U.S. Application Data

(63) Continuation-in-part of application No. 14/611,013, filed on Jan. 30, 2015, now Pat. No. 10,229,455, and a continuation-in-part of application No. 13/787,552, filed on Mar. 6, 2013, now Pat. No. 10,346,906, and a continuation-in-part of application No. 13/772,174, filed on Feb. 20, 2013, now Pat. No. 10,114,798, and a continuation of application No. 13/626,785, filed on Sep. 25, 2012, now abandoned.

(51) Int. Cl.
| | |
|---|---|
| *G16H 10/60* | (2018.01) |
| *G16H 40/20* | (2018.01) |
| *G06F 3/00* | (2006.01) |
| *G06Q 40/02* | (2012.01) |

(52) U.S. Cl.
CPC ........... *G06Q 40/025* (2013.01); *G06Q 40/02* (2013.01)

(58) Field of Classification Search
CPC ...................................................... G06F 40/10
See application file for complete search history.

(56) References Cited

U.S. PATENT DOCUMENTS

| | | |
|---|---|---|
| 7,881,993 B2 | 2/2011 | Sarkar |
| 7,966,254 B2 | 6/2011 | Cavey |

(Continued)

OTHER PUBLICATIONS

Credit Repair Strategies: Becoming an authorized User Vs. Open a Secured Credit Card, Aug. 2012, from the Internet, 3 pages (Year: 2012).

(Continued)

*Primary Examiner* — Shreyans A Patel
(74) *Attorney, Agent, or Firm* — Workman Nydegger

(57) ABSTRACT

The automated generation of a unique letter or unique letters using one or more context variables for the letter. The contextual variables may represent author characteristics, audience characteristics, tone, word diversification, letter type, and so forth. Different entropy may be used for each letter to thereby generate a unique letter even if the context for the letters is the same. Nevertheless, each unique letter is suitable for the given context. If desired, the automatically generated letter may be further edited, for example, for grammatical, word choice, or legal content. Thus, the letter may appear to be custom drafted by a human for the context, whereas the letter was entirely or substantially computer-generated.

21 Claims, 10 Drawing Sheets

(56) References Cited

U.S. PATENT DOCUMENTS

| | | |
|---|---|---|
| 8,065,227 B1 | 11/2011 | Beckman |
| 1,022,945 A1 | 3/2019 | Padawer |
| 2006/0200396 A1 | 9/2006 | Satterfield et al. |
| 2006/0212386 A1 | 9/2006 | Willey et al. |
| 2006/0271450 A1 | 11/2006 | Cohen et al. |
| 2007/0112668 A1 | 5/2007 | Celano |
| 2007/0156557 A1 | 7/2007 | Shao et al. |
| 2008/0284547 A1 | 11/2008 | Zigman |
| 2011/0035305 A1 | 2/2011 | Imrey et al. |
| 2014/0236574 A1* | 8/2014 | Padawer ................ G06F 40/10 704/9 |
| 2015/0142639 A1 | 5/2015 | Padawer |

OTHER PUBLICATIONS

Notification of the ISR and WO cited in PCT/US2013/060180 dated Dec. 27, 2013.
U.S. Appl. No. 13/626,785, filed Sep. 25, 2012, Office Action dated Apr. 17, 2013.
U.S. Appl. No. 13/626,785, filed Sep. 25, 2012, Office Action dated Jan. 17, 2014.
U.S. Appl. No. 13/626,785, filed Sep. 25, 2012, Office Action dated Aug. 1, 2014.
U.S. Appl. No. 14/611,013, filed Jan. 30, 2015, Final Office Action dated Dec. 24, 2015.
U.S. Appl. No. 14/611,013, filed Jan. 30, 2015, Office Action dated May 3, 2017.
U.S. Appl. No. 14/611,013, filed Jan. 30, 2015, Final Office Action dated Mar. 7, 2018.

* cited by examiner

CREDIT REPAIR BY ANALYSIS OF TRADE LINE PROPERTIES

CROSS-REFERENCE TO RELATED APPLICATIONS

This patent application claims priority to and is a continuation-in-part of U.S. patent application Ser. No. 14/611,013, filed Jan. 30, 2015, which issued on Mar. 12, 2019 as U.S. Pat. No. 10,229,455, which is a continuation of U.S. patent application Ser. No. 13/626,785, filed Sep. 25, 2012, now abandoned. This application is also a continuation-in-part of U.S. patent application Ser. No. 13/787,552, filed Mar. 6, 2013, which issued on Jul. 9, 2019 as U.S. Pat. No. 10,346,906. This application is also a continuation-in-part of U.S. application Ser. No. 13/772,174, filed Feb. 20, 2013, which issued on Oct. 30, 2018 as U.S. Pat. No. 10,114,798. All the foregoing applications are explicitly incorporated herein by reference in their entireties

BACKGROUND

The human mind is capable of formulating ideas both concrete and abstract. In order to record such ideas, human beings have historically written down their ideas using written language on a tangible medium. For instance, one common tangible medium is paper, which is still used in modern times. Using modern postal systems, written correspondence can be mailed over great distances allowing remote individuals to communicate.

In the computer age, human beings use computer systems in order to record written language on a computer-readable medium. Typically, the data representing such written language is stored in binary form, with a computer program (such as a word processor) representing such data in human readable form to a human being. To a human, the computer display simulates written correspondence such as a letter, paper, or the like. Such electronic writings may be digitally recorded as well as communicated using computer networks. Throughout this description, any type of written correspondence, whether recorded on a tangible or computer-readable medium, will be termed a "letter".

Human beings author letters as they are capable of complex thought and applying intelligence to formulate a wide variety of written language. For instance, a human being can receive instructions on a certain type of letter to write, a goal of the letter, and a context, and formulate a letter of that type aimed at accomplishing the goal in the designated context. If those instructions are provided to different human beings with the same goal and context, another human being might generate another unique letter aimed towards accomplishing the same goal in the context, but containing different semantic and sentence structures altogether.

Computer systems can generate written language. However, such written language is very deterministic, and not context-based, nor rhetorical. Accordingly, it is often easy to tell when a human being has authored written language, as compared to automatically generated written language. Furthermore, computer generated language is often template-based, and thus given a particular goal or context, a semantically similar letter is generated to the point where it is hardly unique.

A credit bureau (also called a Consumer Reporting Agency or CRA) is a company that collects information from various sources about individuals and aggregates such information into a credit report. Currently, there are three major credit bureaus in the United States including EQUIFAX®, TRANSUNION® and EXPERIAN™.

The credit reports are relied upon by potential and current creditors of the individual, and other authorized entities, when determining whether to take appropriate action regarding the corresponding individual, such as whether to extend credit and under what terms, whether to lease a property, whether to extend an offer of employment, and so forth. Thus, negative items on an individual's credit report can adversely affect the opportunity available to that individual.

Often, a credit score is generated based on the credit report, which allows for a quick and rough approximation of the creditworthiness of the individual. One common credit score used in most applications for credit is called a FICO® SCORE®. FICO and FICO SCORE are registered trademarks of Fair Isaac Corporation. However, there are other scores less commonly used and generated by different algorithms using credit report items as input.

Credit repair services are offered by a number of organizations for the purpose of helping individuals improve their credit scores, thereby improving the opportunities available to the individual. For instance, the credit repair service may impact credit scoring by requesting that credit bureaus demonstrate that an individual's credit report trade lines have been reported fairly and accurately and can be fully substantiated by the associated information providers. For instance, by causing correspondence to be sent to the credit bureaus directly, in the form of an investigative inquiry or perhaps just a dispute regarding a questionable negative item, the credit bureaus may sometimes, but not always, remove that negative item from their credit reports when it is determined that the negative item is either based upon obviously false information, or cannot be readily and fully substantiated, or has not been fairly reported in accordance with applicable consumer protection statutes. Alternatively or in addition, by causing correspondence to be sent to a creditor, the creditor might likewise correspond with the credit bureaus causing the negative item to be removed from affected credit reports. As false, unsubstantiated, or unfairly reported negative items are removed or revised, the individual's credit scores tend to improve.

BRIEF SUMMARY

At least one embodiment described herein relates to automated generation of a unique letter using one or more contextual variables for the letter. In this description, the term "letter" is defined as any written correspondence, whether recorded on a tangible or computer-readable medium. Different entropy may be used for each letter to thereby generate a unique letter even if the context for the letters is the same. Nevertheless, each unique letter is suitable for the given context. If desired, the automatically generated letter may be further edited, for example, for grammar, word choice, or legal content. Thus, the letter may appear to be custom drafted by a human for the context, whereas the letter was entirely or substantially computer-generated.

Letters that are perceived to be drafted by humans tend to be taken more seriously by the reader than letters that are perceived to be computer-generated. When natural, unique, letters are generated, they are more likely to appear to their readers to be entirely human-generated. However, human-drafted letters are more labor intensive than computer-generated letters. Accordingly, the principles described herein allow for the benefits of computer-efficiency in generating letters, while providing unique characteristics associated with human-generated letters.

At least one embodiment described herein relates a computer-implemented method for taking appropriate action on a credit report for an individual using an analysis of properties of at least some of its constituent trade lines. Upon accessing the credit report, each of at least some of the trade lines in the credit report are processed by 1) identifying one or more properties of the trade line, 2) performing one or more removal success rate estimations for similar trade lines having at least one like property, and 3) calculating at least one removability index (e.g., an item removal difficulty index or an item removal speed index) for the trade line based on the removal success estimation(s). The calculated removability indices are then aggregated, and the course of action for the credit report as a whole is determined based on the removability indices.

For instance, as one example, the removability indices may be used in order to identify a sequence in which to intercede on the trade lines. Intercession might be accomplished by, for example, dispatching a letter to a creditor or a credit bureau regarding the trade line. The sequencing may also depend on the anticipated impact of having the trade line removed from the credit report.

The aggregated removability indices may be used to calculate a level of difficulty for improving the credit report, potentially leading to personalized communication with the client. If performed for multiple credit reports for an individual, and factoring in other data such as demographic data, and rate of improvement of credit score, a risk of attrition may be estimated for the individual.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least one embodiment described herein relates to the automated generation of a unique letter or unique letters using certain contextual variable(s) for the letter. The context variables may represent the purpose or goal of the letter, author characteristics, audience characteristics, tone, word diversification, and so forth. Different entropy may be used for each letter to thereby generate a unique letter even if the context for the letters is the same. Nevertheless, each unique letter is suitable for the given context. If desired, the automatically generated letter may be further edited, for example, for grammar, word choice, or legal content. Thus, the letter may appear to be custom drafted by a human in the given context, whereas the letter was entirely or substantially computer-generated. First, some introductory discussion regarding computing systems will be described with respect to FIG. 1. Then, the automated generation of letters will be described with respect to FIGS. 9 through 11 and a number of code examples.

Computing systems are now increasingly taking a wide variety of forms. Computing systems may, for example, be handheld devices, appliances, laptop computers, desktop computers, mainframes, distributed computing systems, or even devices that have not conventionally been considered a computing system. In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

Figure 1:
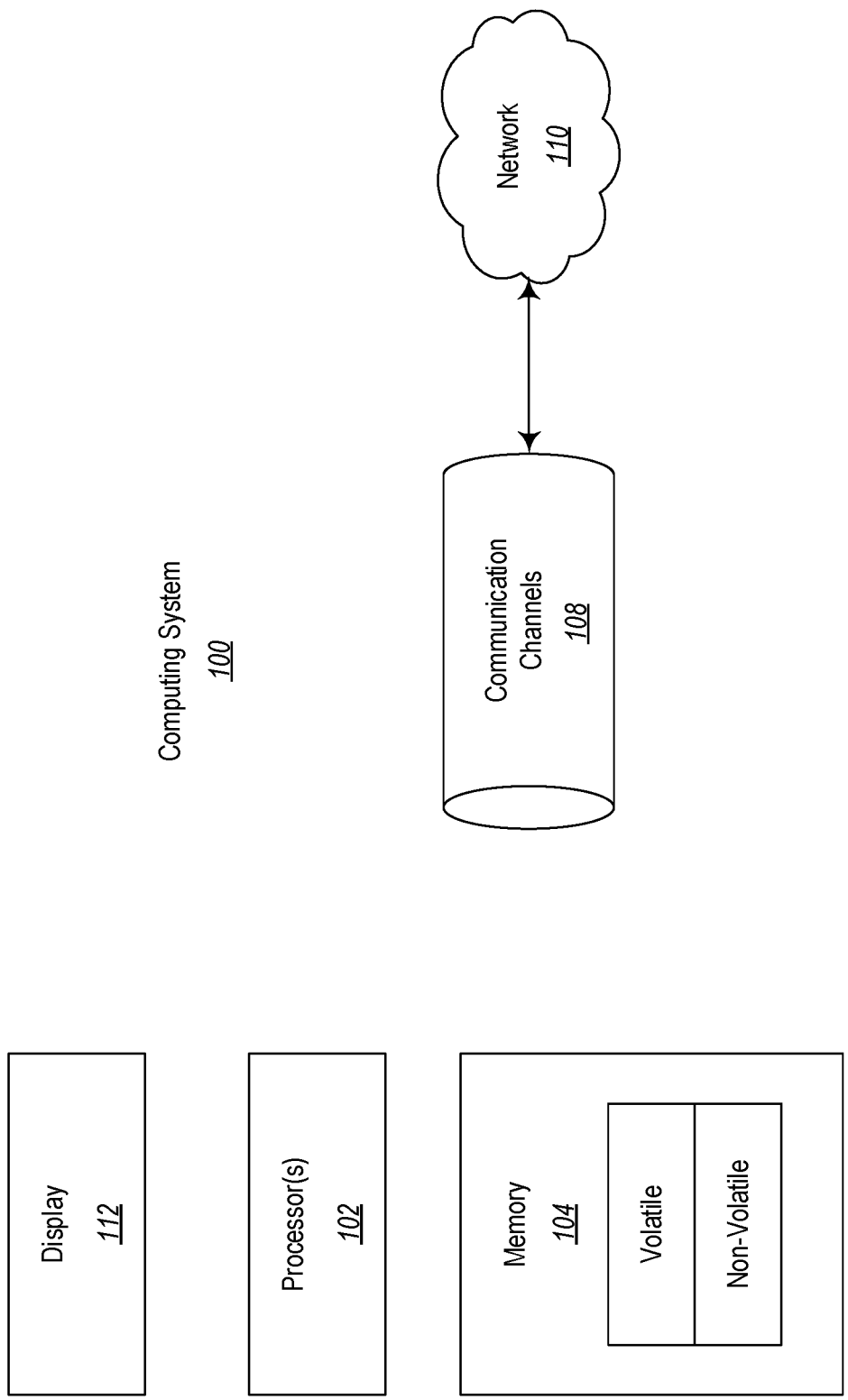
FIG. 1 illustrates a computing system in which some embodiments described herein may be employed.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110. If interaction with the user is beneficial, the computing system 100 may also include a display 112 and potentially other input/output devices.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or store desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 9:
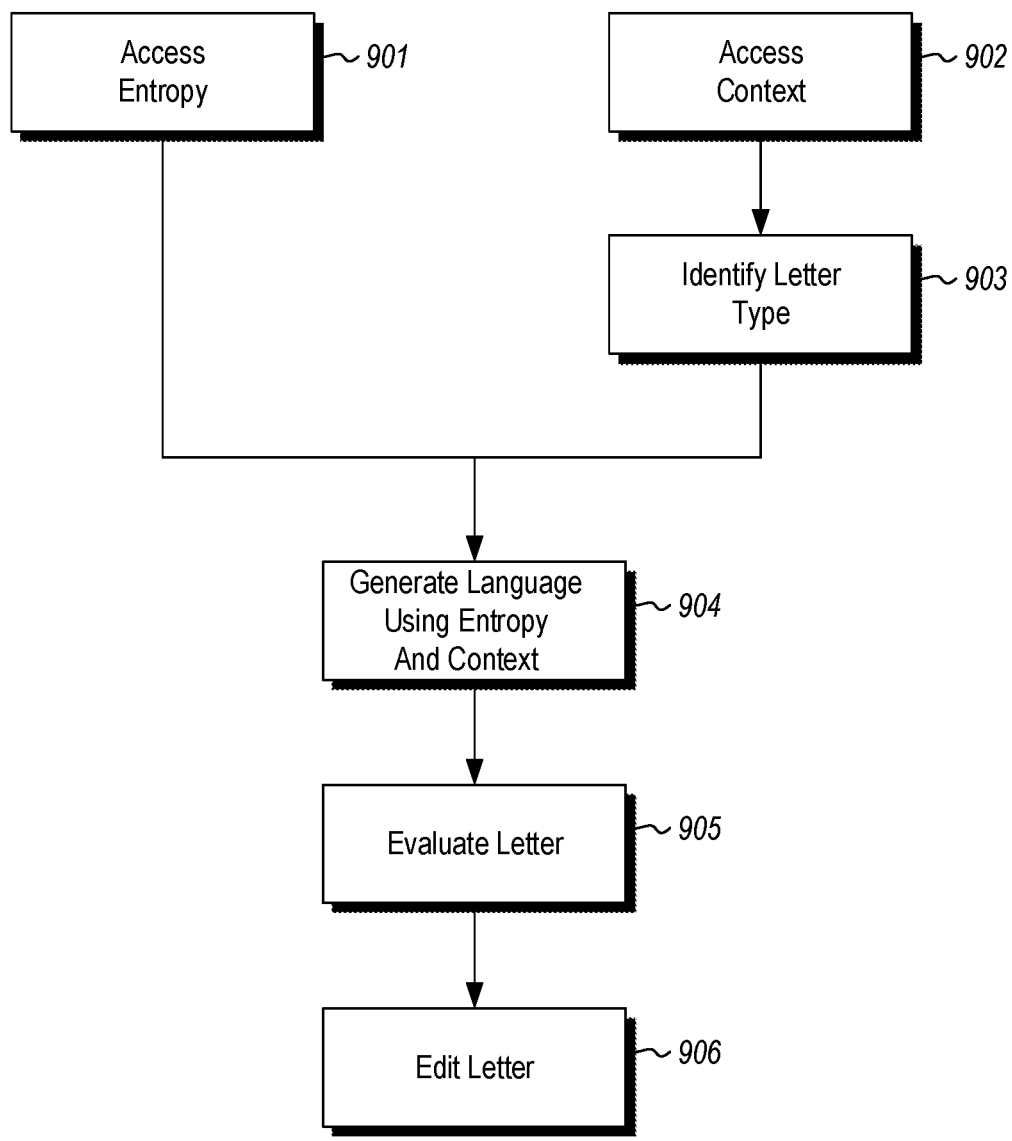
FIG. 9 illustrates a flowchart of a method for automatically generating a letter based on a context.

FIG. 9 illustrates a flowchart of a method 900 for automatically generating a letter based on one or more contextual variables representing a context for the letter. In this description and in the claims, a "letter" is any written correspondence, whether written on a tangible or computer-readable medium. For instance, a letter may be written correspondence having one or more paragraphs on one or more topics and might be addressed to a specific entity.

The method 900 may be performed by, for example, the computing system 100 of FIG. 1. The method 900 may be performed to generate multiple letters based on the same context variable(s). In that case, the method 900 may be performed multiple times sequentially for sequential generation of the letters. However, parallel processors may also be employed so that two or more of such letters may be generated concurrently. Time multiplexed processing may also be employed in which case a single processor may generate multiple letters substantially concurrently.

The letters that are generated are unique, even if the letters are based on an identical context. The computer-generated letters may be subsequently reviewed by a human for grammar, word choice or perhaps for content. Thus, the end result is a unique letter that appears to be entirely drafted by a human being, rather than computer-generated, even though little or no human effort was needed to generate the unique letter. Thus, many letters may be drafted in little time, with each letter having the appearance of being drafted by a human being. Entropy is introduced into the process to promote uniqueness in each letter even given the same context and purpose of the letter. For instance, entropy is introduced into the letter writing process by introducing pseudo-random number generation at a particular point in the letter writing process, and taking a different approach, path, or word choice for the letter writing depending on the outcome of the pseudo-random number generation. This kind of entropy may be introduced at multiple points and levels in the letter writing process.

Having a letter appear to be drafted entirely by a human being has certain advantages. The letter is not seen as a result of a mechanized process, but as a result of actual human effort, which implies that there is human psychological investment in the outcome of the letter. The reader naturally infers that further correspondence is likely if the written requests within the letter are not granted. This in turn increases the percentage chance that the recipient of the letter will empathize with its sender and take action in accordance with such requests. Simply put, a letter that appears to be written by a person, rather than a computer, is more likely to achieve the sender's desired results. Thus, such letters may be advantageous in a number of different contexts, and the principles described herein are not limited to any of these particular contexts.

As an example, the letter might be a letter authored for purposes of repairing credit. Such letters may be dispatched to credit bureaus and creditors in order to enforce their legal rights to inquire as to questionable or unclear credit report entries. However, the letter might also be a public relations letter dispatched to constituencies or stake holders in particular public matters. For instance, elected officials or those running for office may have personalized letters written to their constituencies and potential voters. Other example letters might be for the purpose of responding to an Internet posting, interacting with a customer regarding a complaint, reviewing a product, or the like.

The method 900 automatically generates letters by accessing entropy to be applied to the letter (act 901). Different entropy is input to each letter generation process to ensure that each letter is unique, even if the context for the letter is identical. For instance, pseudo-random functions may be used at different points of the letter writing process to determine the approach, path, or word choice to be used in the letter. The accessing of the entropy could be integrated with the remainder of the method 900, and in particular, may be integrated into the process of generating the language of the letter (act 904). For instance, different segments of entropy may be injected during execution by using randomization processes. Specific code examples showing this integration will be described in detail below.

In addition to accessing entropy, the method 900 accesses one or more contextual variables representing context for the letter (act 902). The accessing of the context could be integrated with the remainder of the method 900, and in particular, may be integrated into the process of generating the language of the letter (act 904). For instance, different segments of entropy may be injected during execution by using randomization processes.

Detailed examples of such context will be described further below. However, the context might include an explicit identification of a type of letter to generate. Alternatively, the context may be analyzed so that the computing system might automatically determine a letter type to send (act 903).

Language is then generated (act 904) for the letter in response to the context variable(s) such that the entropy causes the letter to be unique even given identical contextual variable(s) (act 904). The resulting letter may be evaluated (act 905), and further edited (act 906).

Figure 10:
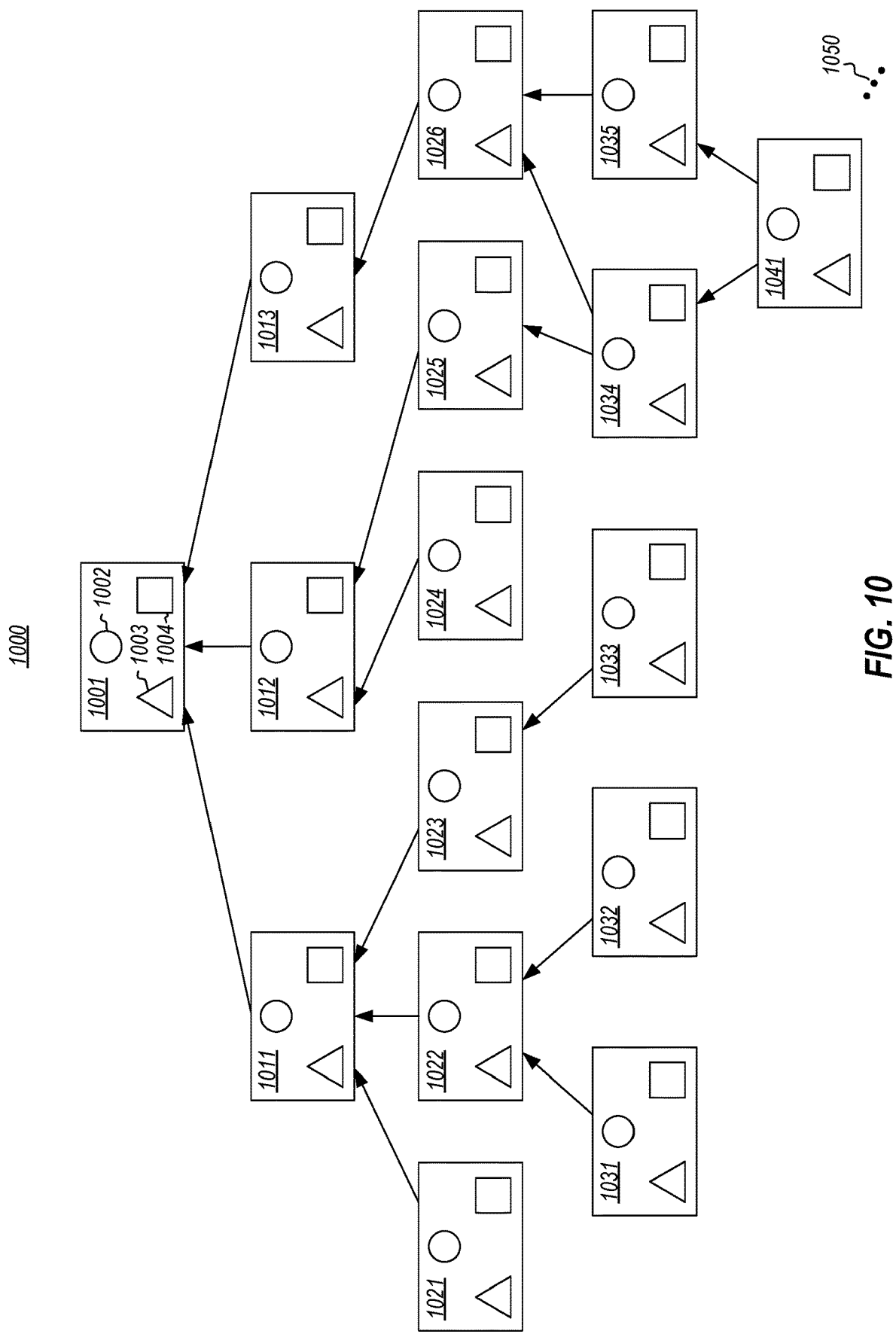
FIG. 10 illustrates a hierarchical structure code structure for generating language of the letter.

FIG. 10 illustrates a hierarchical structure code structure 1000 for generating language of the letter. For instance, the code structure 1000 may be used to perform act 904 in FIG. 9. The main component 1001 of the hierarchical structure is responsible for compiling the largest components of the letter. For instance, the main component 1001 will generate a letter than includes some, most, or even all of the following components: a header, salutation, introduction, request for action, conclusion, and signature block.

There is be a set of rules 1002 that governs whether inclusion of these components into optional or mandatory, and if there is mandatory ordering of the components. For instance, a header might not be included in all letters. However, a request for action might always be included. Furthermore, if an introduction and a request for action are both included, there might be a rule that the introduction is always included before the request for action. Another example is if a request for action and a conclusion are both included, there might be a rule that the conclusion always occurs before the request for action.

There may also be entropy 1003 that is introduced into the main component. Such entropy might be any randomization or pseudo-randomization function in which different actions are performed based on randomized outcomes (e.g., equivalent to a rolling of the dice). For instance, there might be a randomization function that dictates that the header component is included 80% of the time, that the introduction is included 90% of the time, and that the conclusion is included 80% of the time. The randomization might be affected by context.

The main component may also access contextual variables 1004 that affect how the language of the letter is generated. For instance, the contextual variables 1004 might represent a certain tone, whether that tone be an aggressive tone, a mild tone, or something in between. The contextual variables might also represent a goal, purpose, or type of letter to be drafted.

The contextual variables 1004 might represent attributes of the intended audience of the letter. For instance, if the intended audience is an attorney, a lay person, an administrative staff member, a government official, a credit bureau worker, a bank processor, a youth, an adult, or combinations of the above, that may affect the type of letter or the manner in which the letter is written. For instance, a letter to an attorney might be quite formalistic in grammar, style, and vocabulary, whereas a letter to a youth might be more casual in grammar, style, and vocabulary. Other attributes of the audience might be the age, education level, region of habitation, floridity level, and so forth.

The context 1004 might also include attributes of the sender or the person on behalf of whom the letter is being sent (i.e., the simulated author of the letter). Such might be helpful if, for example, the intended audience of the letter is familiar with that sender or person on behalf of whom the letter is being sent either personally, or through prior written correspondence. In one embodiment, an executable component actually takes in samples of that person's writing, automatically evaluates the writing samples for commonly used words, phrases, grammar, and letter structure, so that the characteristics of the person's writing may be emulated in the automated letter generation. Alternatively, or in addition, such evaluation might be performed by a human being. For instance, the human being might evaluate a questionnaire filled in by the simulated author, interact directly with the simulated author, evaluate writing samples of the simulated author, and the like, in order to determine attributes of the author, which may then be coded in proper form to be accessible by the code hierarchy 1000. In one embodiment, the attributes of the simulated author may be derived at least in part by providing a user interface to the user through which the user answers questions.

In the symbolic usage of FIG. 10, the rules for construction for a given component in the hierarchical structure 1000 are represented using a circle within the corresponding rectangle representing that component (e.g., reference circle 1002 in main component 1001). Also, the entropy used within the given component in the hierarchical structure 1000 is represented using a triangle within the corresponding rectangle represented that given component (e.g., reference triangle 1003 in main component 1001). Finally, the context used within the given component in the hierarchical structure 1000 is represented using a square within the corresponding rectangle represented that given component (e.g., reference square 11004 in main component 1001).

A glance on the other first tier code portions 1011, 1012, 1013, second tier code portions 1021 through 1026, third tier code portion 1031 through 1035, and fourth tier code portion 1041 reveals that each of the lower tier code portions may likewise be governed by respective rules (represented by the constituent circle), entropy (represented by the constituent triangle), and context (represented by the constituent square). Not all of the components need access entropy and context. However, the more places that entropy is introduced, and the greater the entropy introduced, the less risk there is that non-unique letters will be generated from the same context. The hierarchy is a bottom up design, where the lower level components feed their output into the upper level components as specified by the upward-facing arrows, in order to build up a letter.

In FIG. 10, a specific hierarchy is illustrated having particular numbers of first, second, third, and fourth tier code portions. However, the ellipses 1050 represent great flexibility in the hierarchy, and that there may be any number of tiers in the hierarchy. The exact hierarchy will depend on the code drafter's experience and manner of drafting code, the type of letter to be drafted, the amount of recursion being performed, and complexity of the letter being drafted, and so forth. Accordingly, the principles described herein are not limited in the slightest upon the exact form of the code hierarchy used to generate the letter, as hierarchies will differ from letter to letter. Concrete code examples will be provided and explained below. However, for now, an example code hierarchy will be described abstractly with respect to FIG. 11.

In the particular example code portion 1000, there are three first-tier components 1011, 1012 and 1013. In general, the first tier components generate larger text components of the letter. Each higher tier component takes and assembles code portions received from lower tier components in response to rules and potentially also entropy and/or context, as previously mentioned. For instance, first tier code portion 1011 receives smaller text portions constructed by each of second tier code portions 1021, 1022 and 1023 and perhaps generates a larger text portion; first tier code portion 1012 receives smaller text portions constructed by each of second tier code portions 1024 and 1025 and perhaps generates a larger text portion; and first tier code portion 1013 receives a smaller text portion constructed by the second tier code portion 1026 and generates a larger text portion.

Proceeding to the next tier, second tier code portion 1022 receives smaller text portions constructed by each of third tier code portions 1031 and 1032, and perhaps generates a larger text portion than that produced by the third tier code portions 1031 and 1032. Second tier code portion 1023 receives a text portion constructed by third tier code portion 1033, and perhaps generates a relatively larger text portion. Second tier code portion 1025 receives a text portion constructed by third tier code portion 1034, and perhaps generates a relatively larger text portion. In addition, second tier code portion 1026 receives text portions constructed by each of the third tier code portions 1034 and 1035, and perhaps generates a relatively larger text portion. For instance, the output of portion 1011 might be a header, and the output of portion 1012 might be the letter body, and the portion 1013 might be the ending. In that case, portion 1024 might represent a letter introduction, portion 1025 might include a request for action portion, and the portion 1026 might be a letter ending with a good will tone.

Note that the hierarchical structure may be highly complex. For instance, third tier code portion 11034 feeds text portions to both of second tier portions 11025 and 11026. Furthermore, fourth tier code portion 11041 feeds text portions to both of third tier portions 11034 and 11035. Thus, a lower tier component may feed text multiple, and perhaps numerous, upper tier components. Furthermore, there may be considerable recursion that occurs. In addition, the hierarchical structure may be constantly changing depending on entropy and/or context at upper tier components.

The leaf nodes in this hierarchical structure are those nodes that are not fed any text by lower tier code portions. For instance, in FIG. 10, code portions 1021, 1031, 1032, 1033, 1024 and 1041 are leaf code portions. In one embodiment, such leaf code portions may select from any number of words or phrases. For instance, the leaf code might select from a dictionary of similar words. Such selection may involve some randomness (i.e., entropy) and may also be influenced by the context. For instance, contexts suggesting greater education levels might be weighed towards more elaborate vocabulary choices. Furthermore, a modifier clause might be added to nominal phrase or nouns with greater probability of modifier usage depending on the context, and with stronger modifiers if the tone is to be aggressive.

Specific example code portions will now be described as examples only. The principles described herein are not limited to such examples, but are instead, defined by the claims. Nevertheless, specific examples can help solidify understanding and are thus liberally provided. Consider the following example, with line numbering added for clarity:

1. switch (the random of (2))
2. case 1
3. put getXAsaloyalcustomer( ) & "," after thePhrase
4. put "I" && getXhavemaintained( ) && getXmyaccount( ) && getXingoodstanding( ) & "." after thePhrase
5. break
6. case 2
7. put "I" && getXhavebeen( ) && getXanaccountholder( ) && getXforquitesometime( ) after thePhrase
8. if the random of (10)<6 then
9. put "and" && getXhavemaintained( ) && getXmyaccount( ) && getXingoodstanding( ) after thePhrase
10. if the random of (10)>5 then
11. put " " & getXformostofthattime( ) & "." after thePhrase
12. else
13. put "." after thePhrase
14. end if
15. else
16. if the random of (10)<7 then
17. put "and am" && getXconcerned( ) && getXsomething( ) & "." after thePhrase
18. else
19. put "." after thePhrase
20. end if
21. end if
22. break
23. default
24. break
25. end switch Reviewing this example, there are 25 lines of code. Line 1 includes a switch operator which randomly chooses between integers 1 or 2. This represents the injection of entropy into the component. If the integer 1 is randomly chosen by the switch operator, then the code for case 1 is executed (corresponding to lines 2 through 5). If the integer 2 is randomly chosen by the switch operating, then the code for case 2 is executed (corresponding to lines 6 through 22). Rather than a strictly random choice, the dice may be weighted, so to speak, in response to context. For instance, the component may be recrafted such that the chance of case 1 increases in some contexts and decreases in other contexts.

Reviewing case 1 (from lines 2 through 5), line 3 puts whatever text is returned by the function getXAsaloyalcustomer, concatenates that string with a comma and a space, and then adds the resulting concatenation to the end of a string represented by the variable called "thePhrase".

The variable "thePhrase" is a temporary memory location that stores the accumulated text so far at this point in executing the code. Thus, even before the 25 line code segment is executed, other code may have already accumulated some text. The function getXAsaloyalcustomer provides some text string that might include "As a loyal customer" or some other close equivalent such as "I have been with your company for several years now", "I have been a customer for some time", "We have had a long and prosperous business history with each other", and so forth with perhaps thousands or millions of possible text output permutations facilitated by the components positioned in lower in the code hierarchy and by the entropy injected into that function and the functions from which it directly or indirectly receives text.

Line 4 concatenates the text "I" with the outputs from function getXhavemaintained, getXmyaccount, and getXisgoodstanding and further concatenates a period ".", and further adds the resulting string to the end of the string variable thePhrase. Again, each of these three functions may have enumerable possible text output depending on the entropy and context provided at or lower than the corresponding function in the code hierarchy.

The code executed in response to case 2 (lines 6 through 22) will now be described. Lines 6 and 22 define the boundaries for case 2.

Line 7 concatenates the text "I" with the outputs from function getXhavebeen, getXanaccountholder, and getXforquitesometime and further concatenates a period ".", and further adds the resulting string to the end of the string variable thePhrase. Again, each of these three functions may have enumerable possible text output depending on the entropy and context provided at or lower than the corresponding function in the code hierarchy.

Line 8 adds further entropy (a second level of entropy) to the process by randomly selecting an integer from 1 to 10, inclusive. If an integer from 1 through 5 is randomly selected in line 8, then lines 9 through 14 are executed. Note that this randomization could again be affected by context such that the division line between the "if" and "else" statement is placed at some other position (e.g., between 7 and 8, rather than between 5 and 6).

Line 9 concatenates the text "and" with the outputs from functions getXhavemaintained, getXmyaccount, and getXingoodstanding, and further adds the resulting string to the end of the string variable thePhrase. Again, each of these three functions may have enumerable possible text output depending on the entropy and context provided at or lower than the corresponding function in the code hierarchy.

Line 10 adds a third level of entropy by again randomly selecting an integer between 1 and 10, inclusive. If line 10 selects an integer from 6 through 10, then line 11 is executed. Otherwise, line 13 is executed. Line 11 involves adding the following string to the end of the string variable thePhrase: a string resulting from concatenating a space with the text output from the function getXformostofthattime and with a period "." If line 10 selects an integer from 1 to 5, the else at line 12 branches to instead cause line 13 to be executed. Line 13 merely adds a period to the end of the string thePhrase.

Returning to the second level of entropy determined in line 8. If the second level of entropy in line 8 chose instead an integer from 6 to 10, the else operator in line 15 triggers execution of the code from lines 16 through 20.

In line 16, another random selection of an integer from 1 to 10 is made. If the selected integer in line 16 is from 1 to 6, inclusive, line 17 is executed, and the following string is added to the end of the string variable thePhrase: "and am" concatenated with the text output from the function getXconcerned and further with the text output from the function getXsomething, and further with a period and a space. Otherwise, if the selected integer in line 16 is from 7 to 10, includes, line 19 is executed in which a period and a space are added to the string variable thePhrase.

The end result of executing lines 1 through 25 along with its various called functions, allows for a number of unique sentences to be constructed. Such text output may be fed further up the code hierarchy until the entire letter is constructed.

The following represents another example of how text could be generated. Here, the code associated with the main function and a number of constituent functions are illustrated.

```
on mouseUp
   put getverbphrase( ) into thePhrase
   if random(10)<7 then
      put "the" after thePhrase
      if random(10)<7 then
         put getmod1phrase( ) & " " after thePhrase
      end if
      put getnounphrase( ) after thePhrase
   else
      put getnoun( ) after thePhrase
   end if
   put thePhrase into cd fld "output"
end mouseUp
- - -
- - - EXAMPLE FUNCTIONS:
function getverbphrase
   global vnum
   return line (random(vnum)) of cd fld "verbs"
end getverbphrase
function getmod1phrase
   global m1num
   put line (random(m1num)) of cd fld "modifiers type 1"
      into theStr
   if random(10)<3 then
      get getmod1phrase( )
      -- recurs
      if it< >last word of theStr then
         put "and" &it after theStr
      end if
   end if
   return word 1 to 3 of theStr
end getmod1phrase
function getmod2phrase
   global m2num,recurs
   if random(10)<5 then
      put getadverb( ) into theStr
   end if
   put line (random(m2num)) of cd fld "modifiers type 2"
      after theStr
```

```
    if random(10)<3 and recurs is false then
      put true into recurs
      get getmod2phrase( )
      if last word of it< >last word of theStr then
        put "and" &it after theStr
      end if
    end if
    return theStr
  end getmod2phrase
  function getadverb
    global m1num
    return line(random(m1num)) of cd fld "modifiers type 1"
      &"ly"
  end getadverb
  function getnounphrase
    global npnum
    put line (random(npnum)) of cd fld "Noun Phrases" into
      theStr
    repeat forever
      put offset ("(n",theStr) into needanoun
      if needanoun is 0 then
        exit repeat
      else
        delete char needanoun of theStr
        delete char needanoun of theStr
        put getnoun( ) into thenoun
        if length(theStr)-needanoun>1 and number of words
          of thenoun>1 then
          delete last char of thenoun
          put "," after thenoun
        end if
        put thenoun after char needanoun of theStr
      end if
    end repeat
    return theStr
  end getnounphrase
  function getnoun
    global nnum,recurs
    put false into recurs
    if random(10)<7 then
      put getmod2phrase( ) &" " into theStr
    end if
    put line (random(nnum)) of cd fld "Nouns" & " " after
      theStr
    return theStr
  end getnoun
- - -
```

In this example, the main function is executed upon detecting a mouse up event. For instance, the user might have just selected a control in the user interface which activated the text generation process. However, the main function might be automatically executed without responding to any particular event. Here, a number of features are shown. Specifically, there are recursion operations. For instance, the function getmod1phrase includes a recursive call to an instance of itself. However, there are limits to the recursion. For instance, the variable recurs defines whether or not execution is already in recursion, and if so, there is no further recursion. Also, rather than select from a fixed number of words, the variables vnum, m1num, m2num, npnum, and nnum define the number of possible selections from respective string arrays "verbs", "modifiers type 1", "modifiers type 2", and "noun phrases", and "Nouns", respectively. For instance, the string arrays "verbs" might include words such as "help", "assist", "support", "aid" and the like. The string "modifiers type 1" might include modifiers such as "extremely", "very", "quite", and so forth.

Figure 11:
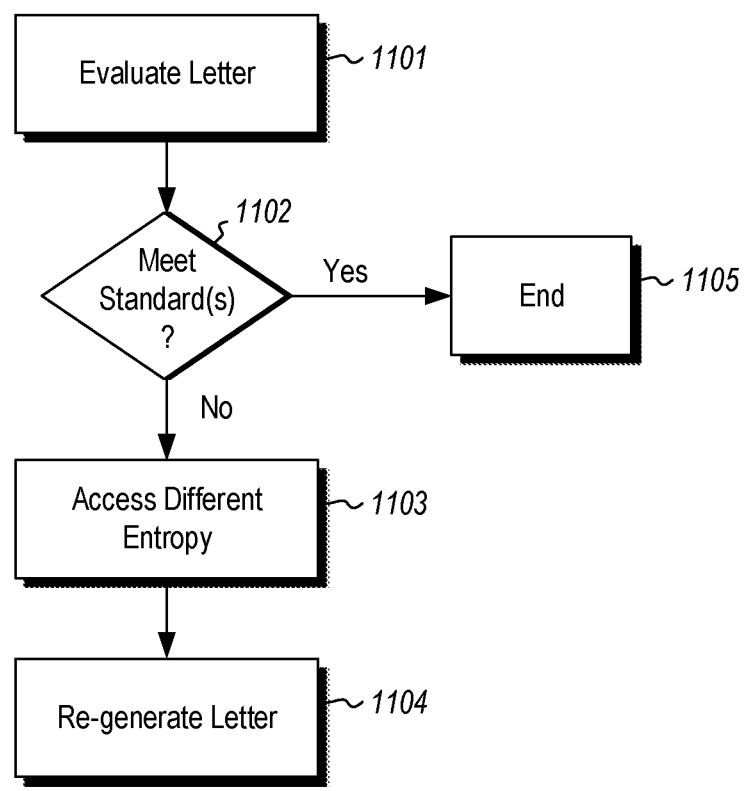
FIG. 11 illustrates an example of a method for post processing of the generated letter.

However, recall again that these specific code examples are just examples only, and are not intended to limit the principles described herein in any way. Accordingly, the principles described herein provide an effective, context-sensitive way to automatically generate a first draft of a letter. As described with respect to FIG. 11, all or portions of the first draft may be regenerated after comparing to certain standards. Accordingly, FIG. 11 illustrates an example of a method 1100 for post processing of the generated letter. FIG. 11 is also an example of the evaluation act 905 in FIG. 9.

The letter is first evaluated (act 1101) to determine whether or not the generated letter meets a particular standard (decision block 1102). This standard may be set by a user and/or may be generated by a computing system. The evaluation may also be performed by a human, though a computing system may also perform the evaluation automatically, and perhaps assign a grade or other quality metric to the generated letter.

If the letter meets the standard ("Yes" in decision block 1102), then the method ends (act 1105). Otherwise, if all or a portion of the letter is below the standard ("No" in decision block 1102), then all or a portion of the letter is regenerated. Specifically, all or a portion of the letter is re-generated by accessing different entropy than before (act 1103), and then re-generating that letter or the relevant portion with the different entropy (act 1104) to thereby repeat act 904 in FIG. 9. If the accessing of the entropy is integrated with the generation of the letter, as in the above code examples, then this simply means re-running that portion of the code responsible for generating the substandard portion of the letter. Thus, the automated or manual review may involve throwing output away, modifying, regenerating, or accepting the output of a code portion as is.

Accordingly, an efficient mechanism for automatically generating contextually relevant and unique letters has been described.

At least one embodiment described herein relates to a method, such as a computer-implemented method, for taking appropriate action on a credit report for an individual based on analysis of properties of at least some of the trade lines of the credit report. Upon accessing the credit report, each of at least some of the trade lines in the credit report are processed by 1) identifying one or more properties of the subject trade line, 2) performing one or more removal success rate estimations for similar trade lines having at least one like property compared to the subject trade line, and 3) calculating at least one removability index (e.g., an item removal difficulty index or an item removal speed index) for the subject trade line based on the removal success estimation(s). The calculated removability indices are then aggregated for multiple trade lines, and the course of action for the credit report as a whole is determined based on the removability indices.

For instance, as one example, the removability indices may be used in order to identify a sequence in which to intercede on the trade lines. Intercession might be accomplished by, for example, dispatching a letter to a creditor or a credit bureau regarding the trade line. The sequencing may also depend on the anticipated impact of having the trade line removed from the credit report.

The aggregated removability indices may be used to calculate a level of difficulty for improving the credit report. If performed for multiple credit reports for an individual, and factoring in other data such as demographic data, and rate of improvement of credit score, a risk of attrition may be estimated for the individual.

A credit report and credit reporting environment will be described with respect to FIGS. 2 and 3. Then, embodiments of the credit repair system and its operation, in accordance with the principles described herein, will be described with respect to FIGS. 4 through 8.

Figure 2:
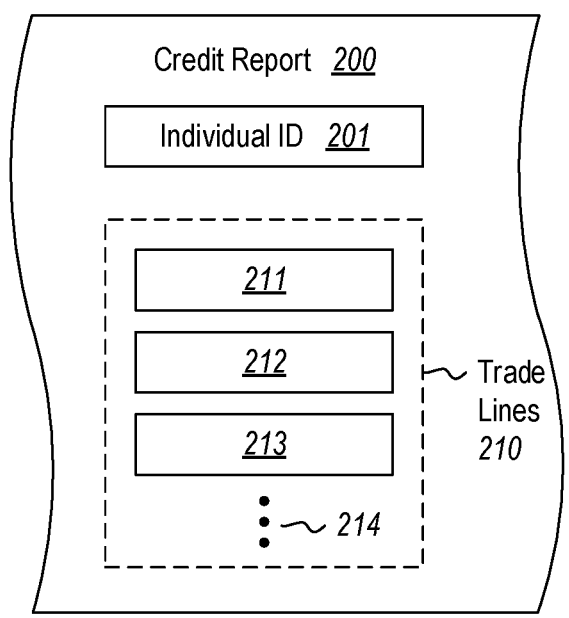
FIG. 2 abstractly illustrates a credit report data structure which includes multiple trade line data structures representing credit report trade lines.

FIG. 2 abstractly represents a credit report 200 that includes a number of trade lines 210 (of which trade lines 211, 212 and 213 are abstractly illustrated) relevant to the creditworthiness of an individual identified in the credit report with an individual identifier 201. The credit report 200 will be referred to herein as a "credit report for an individual" or a "credit report for the individual". The ellipses 214 represent that there may be any number of trade lines 210 in the credit report 200, and will depend on how much information has been provided by creditors and other information providers regarding the individual. A "trade line" is defined herein as any credit report entry. Typically, a trade line will correspond to a credit account attributed to the individual, and may include supplemental information such as, for example, the creditor identifier, the balance, and the status.

Figure 3:
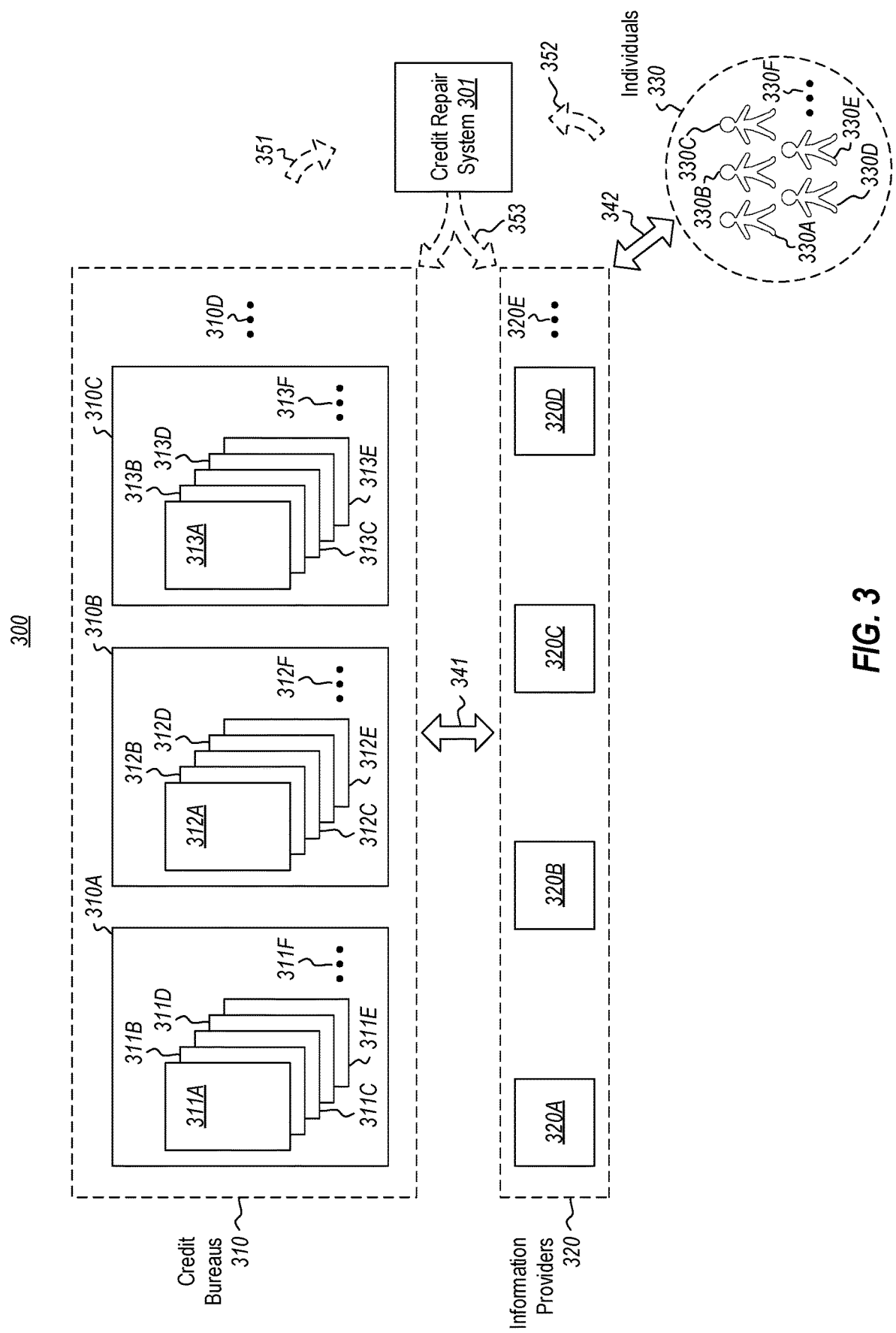
FIG. 3 illustrates a credit reporting environment in which credit reports are generated, including multiple credit bureaus, multiple information providers (such as creditors), multiple individuals, and a credit repair system.

FIG. 3 illustrates a credit reporting environment 300 in which credit reports are generated. The environment 300 includes credit bureaus 310, information providers 320, individuals 330, and a credit repair system 301. The credit bureaus 310 include three credit bureaus 310A, 310B and 310C, although the ellipses 310D represent flexibility in the number of credit bureaus in the environment. In the United States, there are three primary credit bureaus including EQUIFAX®, TRANSUNION® and EXPERIAN™. However, the principles described herein are not limited to the credit bureaus that operate in a particular region of the world, nor are they limited to currently existing credit bureaus.

The credit bureaus 310 each maintain a credit report for each of the individuals 330. For instance, individuals 330 are illustrated as including five individuals 330A through 330E. Accordingly, the credit bureau 310A maintains credit reports 311A through 311E corresponding to respective individuals 330A through 330E, the credit bureau 310B maintains credit reports 312A through 312E corresponding to respective individuals 330A through 330E, and the credit bureau 310C maintains credit reports 313A through 313E corresponding to respective individuals 330A through 330E. The ellipses 330F represent that there may be any number of individuals about whom the credit bureaus maintain a credit report. This flexibility is represented by ellipses 311F, 312F and 313F. Typically, a credit bureau will maintain a credit report regarding each of many millions of individuals. Each credit report is abstractly represented by an instance of the credit report 200 illustrated in FIG. 2.

The environment 200 also includes information providers 320. There are four information providers 320A through 320D illustrated, although the ellipses 320E represent flexibility in this number. Furthermore, for any given individual, the information providers may be different. Information providers are most typically current or prospective creditors of the individual about whom they are providing information. However, other information providers (such as courts or government agencies) might provide information for the credit report.

Information providers might also consume credit reports corresponding to an individual to whom they may extend credit, lease a property, or extend offers of employment. The potential bi-directional nature of such communication is represented by bi-directional arrow 341. The direct or indirect interaction between the individuals 330 and the information providers 320 that results in the information providers 320 obtaining reportable information regarding the individuals 330 is represented by bi-directional arrow 342. Accordingly, through interaction 341 and 342, credit reports may be generated by credit bureaus 310.

Figure 4:
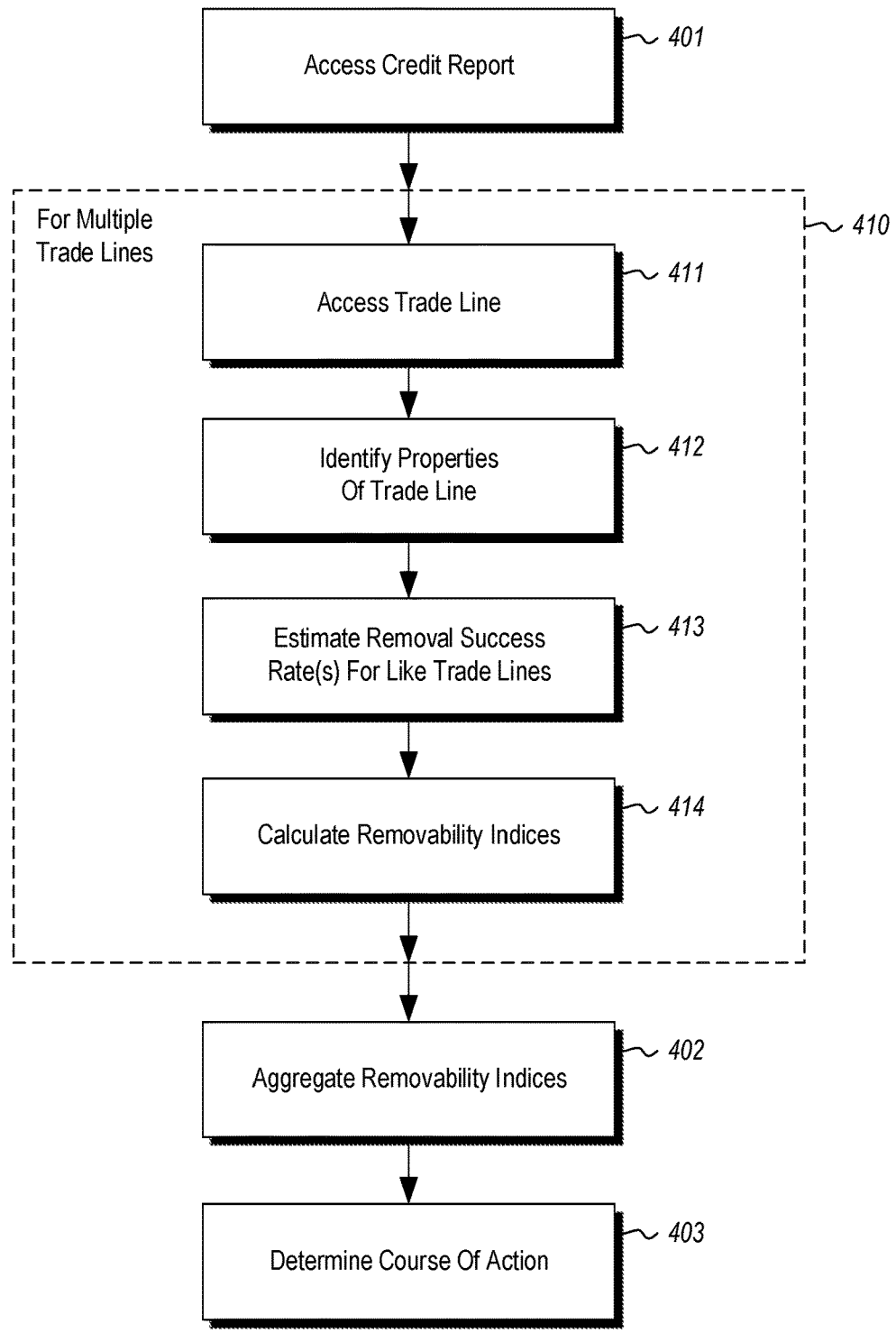
FIG. 4 illustrates a flowchart of a method for determining appropriate action on a credit report using properties of constituent trade lines.

The operation of the credit repair system 301 will now be described with respect to FIGS. 4 through 8. FIG. 4 illustrates a flowchart of a method 400 for determining appropriate action on a credit report using properties of constituent trade lines. In some embodiments, the method 400 may be performed by, for example, the computing system 100 of FIG. 1 implemented in the credit repair system 301 of FIG. 3, although not required.

The method 400 begins by accessing a credit report for an individual (act 401). For instance, referring to FIG. 3, the credit repair system 301 accesses a credit report (e.g., credit report 311A) associated with an individual (e.g., individual 330A). This act might involve accessing the credit report for the individual from multiple credit bureaus. For instance, the credit repair system 301 might access all three credit reports 311A, 312A and 313A from respective credit bureaus associated with a single individual 330A.

The accessing of the credit report may be performed by requesting the corresponding credit report from the credit bureau. In response, as represented by arrow 351 in FIG. 3, the credit bureau responds by dispatching the credit report to the credit repair system 301 as represented by arrow 351 in FIG. 3. For instance, the credit report might be a physical or electronic copy of the credit report. In some embodiments, the credit bureau and the credit repair system may cooperatively interact to exchange data representative of the credit report in which the data is structured accordance with some negotiated schema. For instance, the credit bureau may provide an eXtensible Markup Language (XML) file representing the credit report to the credit repair system 301. As a side note, communications involved in establishing the credit report are represented by solid-lined arrows (e.g., arrows 341 and 342) in FIG. 3. However, communications involved in repairing credit are represented by dotted-lined arrows (e.g., arrows 351, 352 and 353) in FIG. 3.

In some cases, the credit bureau and the credit repair system 301 may not have such an integrated interface. Furthermore, in some cases the credit bureau may not provide even a physical copy of the credit report to the credit repair system 301. In that case, the individual themselves may request the credit report from the credit bureau. Alternatively, the individual may provide authentication credentials to the credit repair system 301, allowing the credit repair system 301 to access the credit report on the individual's behalf online. Both of these cases are represented by the arrow 352 in FIG. 3.

Figure 5:
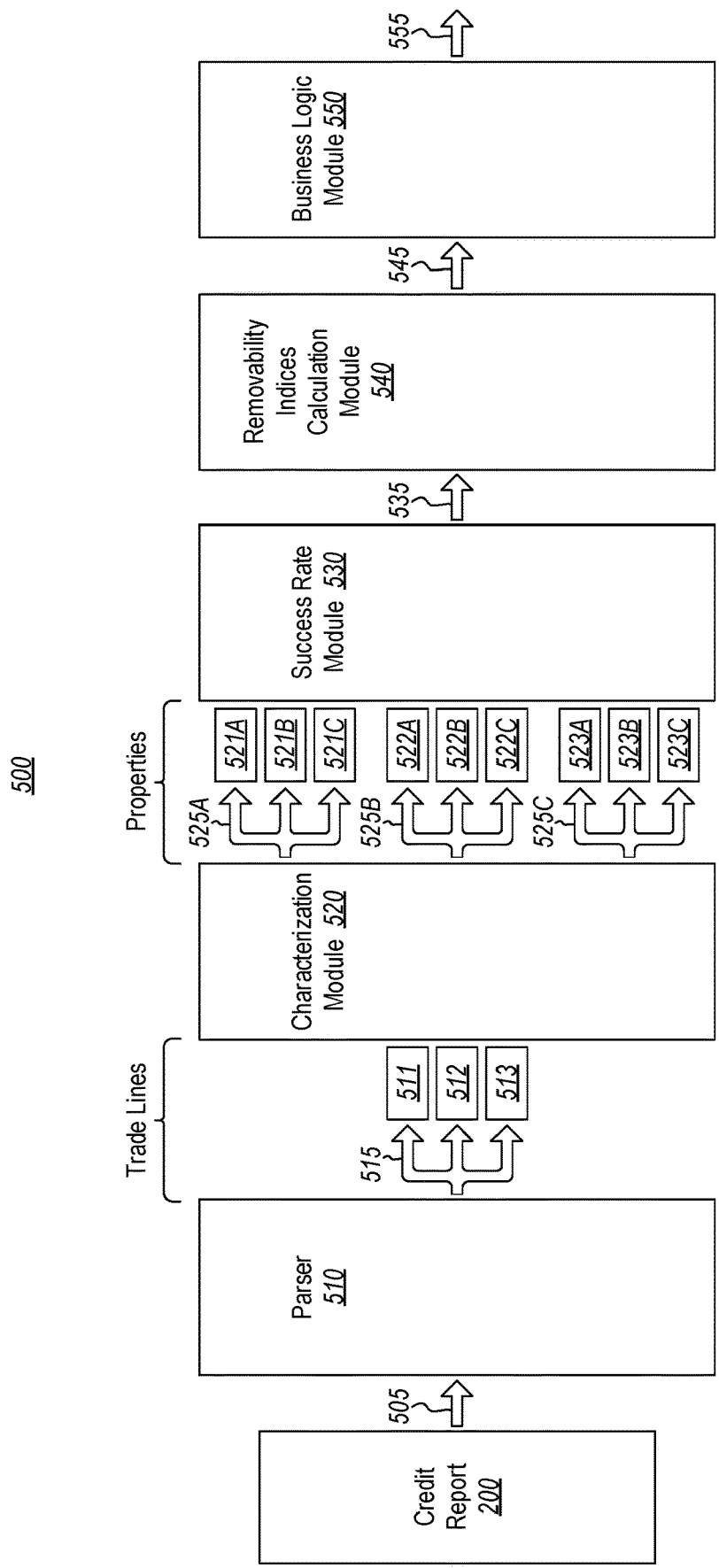
FIG. 5 illustrates a computer architecture that may be represented in memory of a computing system, such as the computing system of FIG. 1, in order to perform the method of FIG. 4.

FIG. 5 illustrates a computer architecture 500 that may be represented in memory of a computing system (such as in the memory 104 of the computing system 100 of FIG. 1), in order to perform the method 400 of FIG. 4. For instance, the computer architecture 500 may be present within a computing system in the credit repair service 301 of FIG. 3. Referring FIG. 5, the credit report 200 is received by the computer architecture as represented by arrow 505.

The various modules 510, 520, 530, 540 and 550 of FIG. 5 may be created in memory by having the computing system accesses computer-executable instructions from memory, and having the computing system executing those computer-executable instructions using one or more digital processors thereby causing the computer architecture 500 of FIG. 5 to be generated and to be operated as described herein. In this description, accessing items "from memory"

and providing "to memory" is not to be interpreted as necessitating that "memory" be a single device or type of memory. The memory may be multiple devices, and multiple different types of memory at perhaps different levels of the memory hierarchy all the way from non-volatile storage (locally or remotely located) all the way up to processor registers. Thus, the term "memory" should be interpreted broadly in the description and in the claims.

Referring to FIG. 4, the contents of dashed-lined box 410 are then performed for each of at least some of the trade lines within the one or more credit reports accessed in act 401. If the credit report is provided in physical form, then a human being might type the trade lines from the credit report into a computing system. Referring to FIG. 5, if the credit report is in electronic format, the parser component may parse the credit report (e.g., credit report 200) to access multiple trade lines from the credit report 200. The parser may further generate corresponding trade line data structures 511 through 513 corresponding to trade lines 211 through 213 of the credit report 200. The number of trade lines extracted by the parser 510 is, however, flexible. The principles described herein do not require that all trade lines be parsed, though it is helpful to parse more.

If the credit report is an image file, the parser 510 may perform text recognition. If the credit report is in text format, the parser 510 may scan the text to find the boundaries of the trade lines. If the credit report is in a predetermined schema (e.g., in XML format), then the parser 510 may perform XML parsing.

The trade line data structures are "passed" from the parser to the characterization module 520 as represented by arrow 515. In this description and in the claims, when a source module of a computer architecture "passes" a data structure to a target module, this means that the source module causes the target module to be able to access the data structure. For instance, one way to do this is to simply provide the data structure to memory at a location that may then be accessed by the target module. Such passing is represented by rightward-facing arrows in FIG. 5.

Referring back to FIG. 4, for each of at least some of the parsed trade lines, the trade line is then accessed (act 411), and a set of one or more properties of the trade line are identified (act 412). Examples of properties of trade lines include 1) whether the trade line is an installment (for an installment loan) or revolving (e.g., a revolving line of credit), 2) the severity type of the trade line, 3) a balance range of the trade line, 4) a utilization ratio range of the trade line and 5), a creditor identity for the trade line.

Examples of severity level values include 30 day, 60 day, 90 day, 120+ day, Charge-off, Collection, Incl in BK, Bankrupcy, Settlement, Repossession, Lien, Judgment, Garnishment, Foreclosure. Examples of balance range values include 0 to 250 dollars, 251 to 500 dollars, 501 to 750 dollars, 751 to 1000 dollars, 1001 to 2500 dollars, 2501 to 5000 dollars, and 5001 dollars and above. Examples of utilization ratio range values include 0 to 10 percent, 10.1 to 30 percent, 30.1 to 50 percent, 50.1 to 70 percent, 70.1 to 80 percent, 80.1 to 90 percent, and 90.1 to 100 percent. Examples of creditor identifier values are names of specific banks, utility companies, collection companies, retail stores, credit card providers, and so forth.

If the method 400 is performed by the computing system 100 in the credit repair system 301, a trade line characterization module 520 identifies a set of one or more properties of the subject trade line (act 412). For instance, the trade line characterization module 520 accesses the digital representation of the trade line 511, identifies a set of one or more properties of the trade line using the accessed trade line digital representation 511, and provides a digital representation 521A, 521B and 521C of the set of one or more properties into memory as represented by arrow 525A. Furthermore, the trade line characterization module 520 accesses the digital representation of the trade line 512, identifies a set of one of more properties of the trade line using the accessed trade line digital representation 512, and provides a digital representation 522A, 522B and 522C of the set of one or more properties into memory as represented by arrow 525B. Also, the trade line characterization module 520 accesses the digital representation of the trade line 513, identifies a set of one or more properties of the trade line using the accessed trade line digital representation 513, and provides a digital representation 523A, 523B and 523C of the set of one or more properties into memory as represented by arrow 525C.

Of course, while in this example each trade line is identified as having three properties, the trade line characterization module 520 may identify any number of properties from the corresponding trade line. For instance, the trade line characterization module 520 might identify 1) the severity level, 2) installment versus revolving, 3) balance range, and 4) creditor name.

Referring back to FIG. 4, one or more removal success rate estimations are then made for like trade likes that have all or a subset of the one or more properties of the subject trade line. For instance, this estimation may be made based on historical success rates for trade lines having one of the properties of the subject trade line. Suppose, for example, that a particular trade line (also referred to as the "subject trade line") being evaluated has the following four property values:

1) Severity Type: Collection
2) Installment versus Revolving: Revolving
3) Balance Level: 501 to 750 dollars
4) Creditor: Fiction Bank, Inc.

In this case, the act 413 might involve calculating as few as one, and as many as four removal success rate estimations. The case of calculating four removal success rate estimations will first be described.

In the case of four removal success rate estimations, to calculate a first remove success rate estimation, the historical performance of the trade lines that also have the first property value "Collection" of the first property "Severity Type" is determined. For instance, suppose that taking all the trade lines having this Severity Type of value Collections, there has been a success rate (referred to as SRA in equation 1 for Success Rate Actual) in response to a single intercession (e.g., the sending of a targeted letter to the creditor or credit agency) of 21%. This value may be compared to the average success rate (referred to as SRE in equation 1 for Success Rate Expected) for a single intercession for all trade lines of 20%. Thus, if a trade line is a Collection trade line, there is a slightly better chance than random of having an intercession be successful. In one embodiment, a removal success rate estimation might be defined by the following Equation 1, where RSRE is the removal success rate estimation.

$$RSRE = N * ((SRE - SRA)/SRE) \qquad (1)$$

Suppose that N is 1000 (but may be arbitrary), this would result in the first RSRE value (corresponding to "Collection" severity type) being 1000*((0.20−0.21)/0.2), which reduces to 1000*(−0.01/0.2), which equals −50. Thus $RSRE_1$ equals −50.

This same Equation 1 may be used again for the second removal success rate estimation ($RSRE_2$), which is determined by evaluating historical removal success rate estimate for all trade lines in which the installment versus revolving value matches that of the subject trade line being evaluated. In this case, that property value is Revolving. For instance, suppose that taking all the trade lines of a Revolving type, there has been a single intercession success rate of 12%. This value may be compared to the average single intercession success rate for all trade lines of 20%. Thus, if a trade line is a Revolving type, there is a much less chance than random of having an intercession be successful. Applying Equation 1 for $RSRE_2$ should then yield 1000*(0.2−0.12/0.2), which equals 400. Thus, we see that positive values for RSRE result in an estimation that these types of trade lines are less successful than average after a single intercession, whereas negative values for RSRE result in an estimation that these types of trade lines are more successful than average after a single intercession.

Equation 1 may be used again for the third removal success rate estimation ($RSRE_3$), which is determined by evaluating historical removal success rates for all trade lines in which the balance level value matches that of the trade line being evaluated (in this case, 501 to 750 dollars). For instance, suppose that taking all the trade lines of a balance level of 501 to 750 dollars, there has been a single intercession success rate of 25%. This value may be compared to the average single intercession success rate for all trade lines of 20%. Thus, if a trade line is a Revolving type, there is a greater chance than random of having an intercession be successful. Applying Equation 1 for $RSRE_3$ should then yield 1000*(0.2-0.25/0.2), which equals −250. Equation 1 may finally be used for the last removal success rate estimation ($RSRE_4$), which is determined by evaluating historical removal success rates for all trade lines in which the creditor identifier value matches that of the trade line being evaluated (in this case, Fictional Bank., Inc.). Needless to say, "Fictional Bank, Inc." is not intended to refer to any specific bank, but is just a fabricated name used simply for the purpose of this description. For instance, suppose that taking all the trade lines for the Fictional Bank, Inc., there has been a single intercession success rate of 20%. This value may be compared to the average single intercession success rate for all trade lines of 20%. Thus, if a trade line corresponds to Fictional Bank, Inc., there is just as much of a chance of a successful intercession as random. Applying Equation 1 for $RSRE_4$ should then yield 1000*(0.2−0.20/0.2), which equals zero.

Thus, in this case, where a removal success rate estimate ($RSRE_1$, $RSRE_2$, $RSRE_3$ and $RSRE_4$) was calculated for each of the four properties of the subject trade line, there are likewise four removal success rate estimates. In another embodiment, there is but one removal success rate estimate. In yet other embodiments, there is some number of estimates between one and the number of properties in the subject property. This description will return to these alternative embodiments further below. But for now, this description will progress further through FIG. 4.

Referring back to FIG. 4, the credit report system then calculates at least one removability index for the trade line based on the at least one removal success estimation (act 414). For instance, in the case of there being one removal success rate estimation RSRE for every property of the trade line, the following values were derived in the example:

$RSRE_1 = -50$;
$RSRE_2 = 400$;
$RSRE_3 = -250$; and
$RSRE_4 = 0$.

The calculation of the removability index might be obtained by using these four factors. For instance, the four RSRE values might be simply summed, which would lead to a removability index of positive 100 (e.g., −50+400−250+0). Of course, other more complex functions might also be used. The removability index might be referred to as an "item difficulty valence" or "IDV" herein.

In some embodiments, as an alternative or in addition to calculating the IDV, another removability index may be calculated. For instance, such might be referred to as an "item speed valence" or "ISV". In this case, different RSRE values might be calculated for each of the four properties based on an average speed in which like trade lines are resolved, when they are resolved. A similar calculation on these other RSRE values may be used to determine in ISV for the trade line. These removability indices are, however, just examples. Any removability index for a trade line that provides some clue as to the likelihood and/or speed in being able to remove the trade line from the credit report will suffice consistent with the broader principles described herein.

In this example, four RSRE values were used to calculate a single IDV value for a trade line. In an alternative embodiment, a single RSRE value might have been calculated. For instance, consider the same example in which there is a trade line for a revolving line of credit from Fiction Bank, Inc. that was in collection, and having a balance in the range of 501 to 750 dollars. If the historical data was refined enough, there might be enough of a sample size to be able to determine historical success rates for exactly those types of trade lines that have all four properties being the same. For instance, if the overall success rate was 18.5 percent for exactly that type of trade line, Equation 1 might be applied to determine a single RSRE value ($RSRE_{1234}$) of 1000*((0.2−0.185)/0.2), which equals 75. In this case, the calculation of the IDV value (in act 414) might be trivial, and just made equal to the RSRE value. An ISV value may be calculated in a similar way if there is sufficient historical speed data regarding trade lines of that exact type.

Accordingly, two examples have been described, a first in which four RSRE values were determined ($RSRE_1$, $RSRE_2$, $RSRE_3$ and $RSRE_4$) and the removability index calculated based on those four factors, and a second in which a single RSRE value was determined ($RSRE_{1234}$) and the removability index calculated based on that factor. However, in hybrid approaches, there might be only two RSRE values calculated, one based on one property (e.g., $RSRE_1$) and one based on a combination of the other properties (e.g., $RSRE_{234}$). All other permutations are contemplated to be within the scope of the principles described herein. Also, all manner of calculation of the RSRE values are also contemplated to be within the scope of the principles described herein.

In any case, if the calculation of the removability index is performed by a computing system 100 in the context of the credit repair system 301 of FIG. 3, the calculation may be performed by, for example, the removability indices calculation module 540, which receives the removal success estimations as represented by arrow 535. For instance, the removability indices calculation module 540 may access the removal success estimations from memory, calculate the removability indices and digitally represent such as a removability index data structure, and provide the digital representation of the removability indices into memory as represented by arrow 545.

The contents of box 410 may be performed for multiple trade lines as previously mentioned. Accordingly, one or more removability indices for each of multiple trade lines may be aggregated (act 402). Then, a course of action may then be determined based on the calculated removability indices (act 403). For instance, if performed by a computer system 100 in the credit repair system 301, a business logic module 550 accesses the digital representations of the removability indices from memory as represented by arrow 545, calculates an appropriate action based on this input, which the appropriate action represented by arrow 555.

Figure 6:
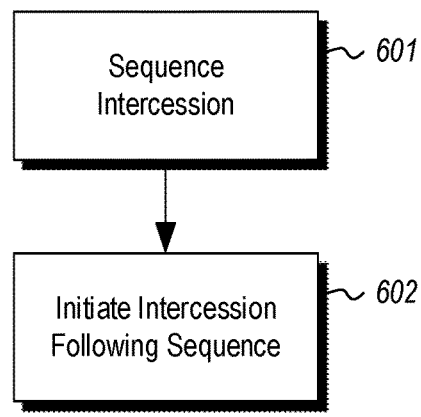
FIG. 6 illustrates a flowchart of a method for performing a first course of action including the sequencing of intercession for the trade lines.

FIG. 6 illustrates a flowchart of a method 600 for accomplishing a first course of action. In this embodiment, the course of action is that a sequence of intercession of the trade lines is embarked upon. An example of an intercession with respect to trade line is the dispatching of a targeted letter regarding the trade line to the corresponding creditor or to the credit bureau. This dispatching is represented by the arrow 353 in FIG. 3. First, the method 600 includes sequencing initiation of intercession associated with trade lines corresponding to the calculated removability indices at least in part based on the calculated removability indices (act 601). Client preferences may be used to perform this sequencing, in addition to consulting the calculated removability indices. Easier intercessions that result in greater impact on credit score might, for example, be targeted for earlier action to that the client can experience more rapid early improvement in the credit score. Such may help the client realize the effectiveness of the credit repair service 301.

Once the sequence is generated, intercession may be initiated according to the sequence (act 602). For instance, when it is time to initiate intercession associated with a trade line, a physical letter relating to the trade line is mailed to a creditor associated with the trade line, or a credit bureau associated with the credit report. However, the principles described herein are not limited to any particular type of intercession mechanism. Other communication mechanisms such as in person, telephonic, or electronic may also be used to intercede for the client for a given trade line.

In the embodiments described above, the statistics associated with historical success rates were evaluated based on actual empirical success rates based on trade lines having similar properties to the subject trade line. However, the intercession methodology was left generic in this analysis. However, the statistical analysis may be further refined by evaluating historical success rates associated with different intercession methodology. For instance, one intercession methodology might be to send a letter of a first type to a creditor, whereas another methodology might be to send a letter of a second type to the creditor, and yet a third methodology might be to send a letter of a third type to the credit bureau. Refined estimates of success may thus be determined based not only on the historical success rates of like trade lines, but alternatively or addition, may be based upon different intercession methodologies. Thus, in addition to choosing a sequencing of intercession, the intercession methodology for each trade line may also be determined.

Figure 7:
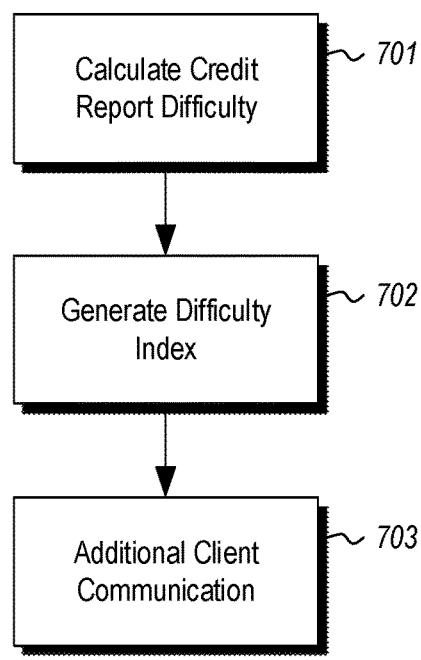
FIG. 7 illustrates a flowchart of a method for performing a second course of action including determining a difficulty of the credit report.

FIG. 7 illustrates a flowchart of a method 700 corresponding to a second course of action. In this second course of action, a relative difficulty in improving the credit report is calculated based on the aggregated removability indices (act 701). The method 700 generates an index of difficulty for the credit report (702). For instance, this difficulty index may be proportional to the sum of the removability indices of the various trade lines in the credit report. The method 700 then involves performing additional client communications based on the calculated difficulty in improving the credit report (act 703). For instance, telephonic, electronic or postal communications may be dispatched to the client, particularly if the credit report is anticipated to be a difficult case for credit repair.

Figure 8:
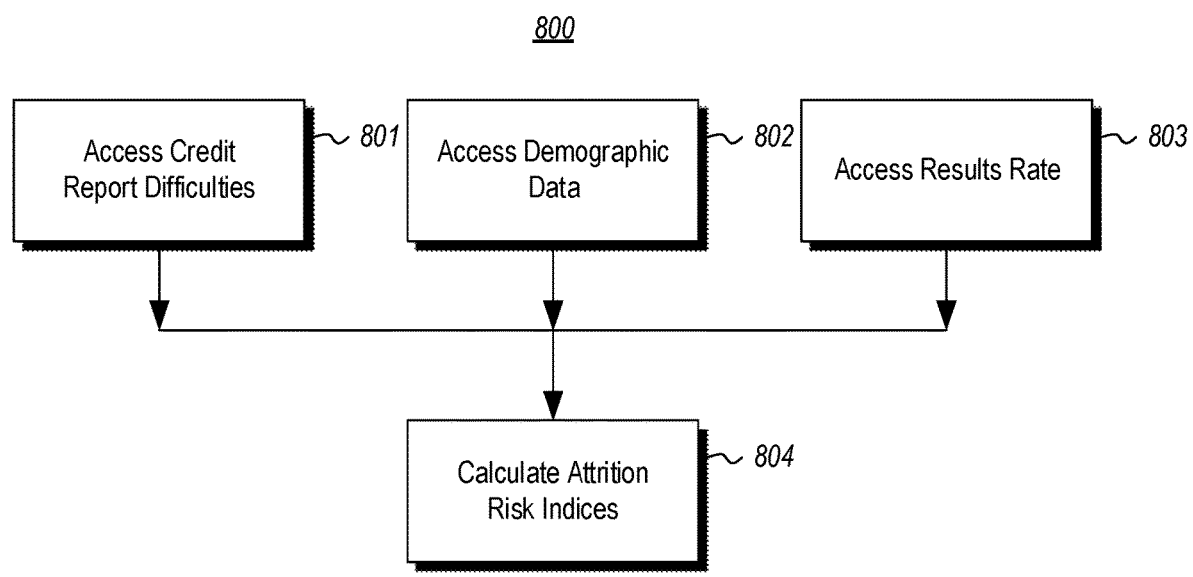
FIG. 8 illustrates a flowchart of a method for performing a third course of action including determining an attrition risk for the client.

FIG. 8 illustrates a flowchart of a method 800 corresponding to a third course of action associated with estimating a risk of attrition of a client requesting improvement of a credit report of the individual. In this method 800, a calculated difficulty in improving the credit report is accessed (act 801). For instance, the difficulty index calculated in act 702 of method 700 may be accessed. As the credit repair service 301 may access various iterations of the credit report, the difficulty index associated with prior iterations of the credit report may also be accessed (also act 801). Also, demographics of the client may be accessed (act 802), in addition to a results rate in improving the credit report of the individual (act 803). Based on these input factors, a risk of attribution associated with the client may be calculated (act 804). Such calculation may, for example, be based on historical data regarding attrition of prior clients.

Accordingly, the principles described herein provide an advanced mechanism for evaluating credit repair techniques. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer-implemented method that causes a computing system to generate a letter, the computing system comprising one or more processors and a memory storing computer-executable instructions that are executed by the one or more processors of the computing system for causing the computing system to perform the method, the method comprising:

generating a first random number;
selecting, based on the first random number, one text string from a first plurality of text strings;
generating a second random number;
selecting, based on the second random number, one text string from a second plurality of text strings;
generating a third random number;
selecting, based on the third random number, one text string from a third plurality of text strings;
obtaining a first set of rules that defines a mandatory ordering for each of the following letter portions: (a) the salutation of the letter, (b) the request for action in the letter, and (c) the signature block of the letter; and
generating the letter using at least the one text string selected from the first plurality of text strings, the one text string selected from the second plurality of text strings, and the one text string selected from the third plurality of text strings, wherein generating the letter is performed by evaluating the first set of rules against each of the following: (a) the one text string selected from the first plurality of text strings, (b) the one text string selected from the second plurality of text strings, and (c) the one text string selected from the third plurality of text strings.

2. The method of claim 1, wherein the computing system further stores the following: (a) the first plurality of text strings, each of the first plurality of text strings being suitable for use in at least a first portion of a salutation in a letter, (b) the second plurality of text strings, each of the second plurality of text strings being suitable for use in at least a first portion of a request for action in a letter, and (c) the third plurality of text strings, each of the third plurality of text strings being suitable for use in at least a first portion of a signature block in a letter.

3. The method of claim 1, wherein the computing system further stores a fourth plurality of text strings, each of the fourth plurality of text strings being suitable for use in at least a portion of a heading in a letter, the method further comprising:
generating a fourth random number;
deciding, based on the fourth random number, whether to include a heading in the letter; and
if, based on the fourth random number, a decision is made to include the heading in the letter:
generating a fifth random number;
selecting, based on the fifth random number, one text string from the fourth plurality of text strings; and
generating the letter also using the one text string selected from the fourth plurality of text strings.

4. The method of claim 3, wherein a threshold is set for the fourth random number such that a decision to include the heading in the letter is made at least 80% of times in which the fourth random number is generated.

5. The method of claim 1, wherein the computing system further stores a fourth plurality of text strings, each of the fourth plurality of text strings being suitable for use in at least a second portion of a salutation in a letter, the method further comprising:
generating a fourth random number;
selecting, based on the fourth random number, one text string from the fourth plurality of text strings; and
generating the letter also using the one text string selected from the fourth plurality of text strings.

6. The method of claim 1, wherein the memory further stores a fourth plurality of text strings, each of the fourth plurality of text strings being suitable for use in at least a second portion of a request for action in a letter, the method further comprising:
generating a fourth random number;
selecting, based on the fourth random number, one text string from the fourth plurality of text strings; and
generating the letter also using the one text string selected from the fourth plurality of text strings.

7. The method of claim 1, wherein the memory further stores a fourth plurality of text strings, each of the fourth plurality of text strings being suitable for use in at least a second portion of a signature block in a letter, the method further comprising:
generating a fourth random number;
selecting, based on the fourth random number, one text string from the fourth plurality of text strings; and
generating the letter also using the one text string selected from the fourth plurality of text strings.

8. The method of claim 1, wherein said one text string from the first plurality of text strings is selected from the first plurality of text strings also based on a contextual variable, said one text string from the second plurality of text strings is selected from the second plurality of text strings also based on the contextual variable, and/or said one text string from the third plurality of text strings is selected from the third plurality of text strings also based on the contextual variable.

9. The method of claim 8, wherein the contextual variable represents a tone for the letter.

10. The method of claim 8, wherein the contextual variable represents an intended audience for the letter.

11. The method of claim 8, wherein the contextual variable represents an attribute of a person on behalf of whom the letter is being generated.

12. The method of claim 8 wherein the contextual variable represents a type of the letter.

13. The method of claim 12 wherein the type of the letter is a credit repair letter.

14. The method of claim 1, wherein the memory further stores (a) a fourth plurality of text strings, each of the fourth plurality of text strings being suitable for use in a header of a letter, (b) a fifth plurality of text strings, each of the fifth plurality of text strings being suitable for use in an introduction of a letter, (c) a sixth plurality of text strings, each of the sixth plurality of text strings being suitable for use in a conclusion of a letter, the method further comprising:
generating a fourth random number;
selecting, based on the fourth random number, one text string from the fourth plurality of text strings;
generating a fifth random number;
selecting, based on the fifth random number, one text string from the fifth plurality of text strings;
generating a sixth random number;
selecting, based on the sixth random number, one text string from the sixth plurality of text strings; and
generating the letter also using the one text string selected from the fourth plurality of text strings, the one text string selected from the fifth plurality of text strings, and the one text string selected from the sixth plurality of text strings.

15. The method of claim 1, wherein there are sufficient numbers of text strings in the first plurality of text strings, the second plurality of text strings, and the third plurality of text strings so that the computing system is enabled to generate one of at least a thousand permutations of letters, including the letter, each letter in the at least the thousand permutations of letters being unique to all other letters in the at least the thousand permutations of letters.

16. The method of claim 1, wherein there are sufficient numbers of text strings in the first plurality of text strings, the second plurality of text strings, and the third plurality of text strings so that the computing system is enabled to generate one of at least a million permutations of letters, including the letter, each letter in the at least the million permutations of letters being unique to all other letters in the at least the million permutations of letters.

17. The method of claim 5, wherein said one text string from the first plurality of text strings is selected from the first plurality of text strings also based on a contextual variable, said one text string from the second plurality of text strings is selected from the second plurality of text strings also based on the contextual variable, said one text string from the third plurality of text strings is selected from the third plurality of text strings also based on the contextual variable, and/or said one text string from the fourth plurality of text strings is selected from the fourth plurality of text strings also based on the contextual variable.

18. The method of claim 17, wherein the contextual variable represents a tone for the letter, an intended audience for the letter, an attribute of a person on behalf of whom the letter is being generated, or a type of the letter.

19. The method of claim 17, wherein there are sufficient numbers of text strings in the first plurality of text strings, the second plurality of text strings, the third plurality of text strings, and the fourth plurality of strings such that the computing system is enabled to generate one of at least a thousand permutations of letters, including the letter, each letter in the at least the thousand permutations of letters being unique to all other letters in the at least the thousand permutations of letters.

20. A computing system comprising:
one or more hardware processors; and
one or more storage device storing computer-executable instructions that are executable by the one or more hardware processors to cause the computing system to generate a letter by performing the following:
generate a first random number;
select, based on the first random number, one text string from a first plurality of text strings;
generate a second random number;
select, based on the second random number, one text string from a second plurality of text strings;
generate a third random number;
select, based on the third random number, one text string from a third plurality of text strings;
obtain a first set of rules that defines a mandatory ordering for each of the following letter portions: (a) the salutation of the letter, (b) the request for action in the letter, and (c) the signature block of the letter; and
generate the letter using at least the one text string selected from the first plurality of text strings, the one text string selected from the second plurality of text strings, and the one text string selected from the third plurality of text strings, wherein generating the letter is performed by evaluating the first set of rules against each of the following: (a) the one text string selected from the first plurality of text strings, (b) the one text string selected from the second plurality of text strings, and (c) the one text string selected from the third plurality of text strings.

21. One or more hardware storage device storing computer-executable instructions that are executable by one or more hardware processors of a computing system for causing the computing system to generate a letter by performing the following:
generate a first random number;
select, based on the first random number, one text string from a first plurality of text strings;
generate a second random number;
select, based on the second random number, one text string from a second plurality of text strings;
generate a third random number;
select, based on the third random number, one text string from a third plurality of text strings;
obtain a first set of rules that defines a mandatory ordering for each of the following letter portions: (a) the salutation of the letter, (b) the request for action in the letter, and (c) the signature block of the letter; and
generate the letter using at least the one text string selected from the first plurality of text strings, the one text string selected from the second plurality of text strings, and the one text string selected from the third plurality of text strings, wherein generating the letter is performed by evaluating the first set of rules against each of the following: (a) the one text string selected from the first plurality of text strings, (b) the one text string selected from the second plurality of text strings, and (c) the one text string selected from the third plurality of text strings.

* * * * *